(12) United States Patent
Yoon et al.

(10) Patent No.: US 9,458,276 B2
(45) Date of Patent: *Oct. 4, 2016

(54) ELASTIC TERPOLYMER AND PREPARATION METHOD THEREOF

(71) Applicant: LG CHEM, LTD., Seoul (KR)

(72) Inventors: Sung-Cheol Yoon, Daejeon (KR); Jun-Seok Ko, Daejeon (KR); Sung-Ho Park, Daejeon (KR); Soo-Young Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/440,563

(22) PCT Filed: Nov. 15, 2012

(86) PCT No.: PCT/KR2012/009664
§ 371 (c)(1),
(2) Date: May 4, 2015

(87) PCT Pub. No.: WO2014/077428
PCT Pub. Date: May 22, 2014

(65) Prior Publication Data
US 2015/0299361 A1    Oct. 22, 2015

(30) Foreign Application Priority Data
Nov. 14, 2012 (KR) .................. 10-2012-0128787

(51) Int. Cl.
| | | |
|---|---|---|
| *C08F 210/18* | (2006.01) | |
| *C08F 236/20* | (2006.01) | |
| *C08F 4/659* | (2006.01) | |

(52) U.S. Cl.
CPC ........... *C08F 236/20* (2013.01); *C08F 210/18* (2013.01); *C08F 4/65908* (2013.01)

(58) Field of Classification Search
CPC .......... C08F 210/18; C08F 4/76; C08F 4/64; C08F 4/6592; C08F 4/65908; C08L 23/16
See application file for complete search history.

(56) References Cited

U.S. PATENT DOCUMENTS

| | | | |
|---|---|---|---|
| 5,229,478 A | 7/1993 | Floyd et al. | |
| 5,763,533 A | 6/1998 | Dharmarajan et al. | |
| 6,372,847 B1 * | 4/2002 | Wouters .................. | C08L 23/10 525/191 |
| 6,465,584 B1 * | 10/2002 | Evens .................... | C08F 210/18 502/104 |
| 6,545,088 B1 | 4/2003 | Kolthammer et al. | |
| 2011/0172451 A1 | 7/2011 | Lee et al. | |
| 2012/0108772 A1 * | 5/2012 | Lee ....................... | C08F 210/06 526/131 |
| 2012/0259077 A1 | 10/2012 | Ha et al. | |

FOREIGN PATENT DOCUMENTS

| | | |
|---|---|---|
| JP | 06-256664 A | 9/1994 |
| JP | 07-002941 A | 1/1995 |
| JP | 07003382 A | 1/1995 |
| JP | 07149834 A | 6/1995 |
| JP | 3672338 B2 | 4/2005 |
| JP | 2010-514836 A | 5/2010 |
| JP | 2012-153756 A | 8/2012 |
| JP | 2012-531503 A | 12/2012 |
| JP | 2013-510221 A | 3/2013 |
| KR | 10-0190430 B1 | 1/1999 |
| KR | 100190428 B1 | 1/1999 |
| KR | 1020000010950 | 2/2000 |
| KR | 100488833 B1 | 5/2005 |
| KR | 100553488 B1 | 2/2006 |
| KR | 100820542 B1 | 4/2008 |
| KR | 1020080065868 A | 7/2008 |
| KR | 1020080065868 A | 7/2008 |
| KR | 1020100081485 A | 7/2010 |
| KR | 100976131 B1 | 8/2010 |
| KR | 1020120016596 A | 2/2012 |
| KR | 1020120016596 A | 2/2012 |

OTHER PUBLICATIONS

M. Kakugo, et al.: "13C NMR Determination of Monomer Sequence Distribution in Ethylene-Propylene Copolymers Prepared with δ-TiCl3-Al(C2H5)2Cl", Macromolecules 1982. 15, pp. 1150-1152.
J. C. Randall, "Carbon-13 NMR of Ethylene-1-Olefin Copolymers: Extension to the Short-Chain Branch Distribution in a Low-Density Polyethylene", Journal of Polymer Science: Polymer Physics Edition, vol. 11, 1973, pp. 275-287.
F. M. Mirabella, et al.: "Melting Behavior of Polyethylene/α-Olefin Copolymers: Narrow Composition Distribution Copolymers and Fractions from Ziegler-Natta and Single-Site Catalyst Products", Journal of Polymer Science: Part B: Polymer Physics, vol. 42, 2004, pp. 3416-3427.

* cited by examiner

*Primary Examiner* — Rip A Lee
(74) *Attorney, Agent, or Firm* — Dentons US LLP

(57) ABSTRACT

The present invention relates to an elastic terpolymer that can acquire good mechanical properties and elasticity (flexibility) at the same time, and a preparation method thereof. The elastic terpolymer, which is a copolymer of 40 to 70 wt % of ethylene, 15 to 55 wt % of a $C_3$-$C_{20}$ alpha-olefin, and 0.5 to 20 wt % of a diene as obtained in the presence of a group 4 transition metal catalyst, satisfies that: (i) the weight average molecular weight measured by GPC is 100,000 to 500,000; and (ii) the ethylene content x (wt %) and the crystallization enthalpy y ($\Delta$HcJ/g) of the copolymer measured by DSC satisfy a defined relational expression.

15 Claims, 2 Drawing Sheets

ELASTIC TERPOLYMER AND PREPARATION METHOD THEREOF

This application is a National Stage Entry of International Application No. PCT/KR2012/009664, filed Nov. 15, 2012, and claims the priority to and benefit of Korean Patent Application No. 10-2012-0128787, filed on Nov. 14, 2012, each of which is hereby incorporated by reference in its entirety for all purposes as if fully set forth herein.

TECHNICAL FIELD

The present invention relates to an elastic terpolymer that is a copolymer of ethylene, alpha-olefin and diene, and a preparation method thereof. More specifically, the present invention relates to an elastic terpolymer that can acquire good mechanical properties and elasticity (flexibility) at the same time, and a preparation method thereof.

BACKGROUND

EPDM rubber, an elastic terpolymer of ethylene, an alpha-olefin such as propylene, and a diene such as ethylidene norbornene, has the molecular structure not including an unsaturated bond in the main chain and displays superiority to general conjugated diene rubbers in regards to weather resistance, chemical resistance, heat resistance, and so forth. Due to the characteristics, the elastic terpolymer such as EPDM rubber has been widely used for industrial materials, such as materials for all sorts of automobile parts, electric wires, hoses for construction or other use purposes, gaskets, belts, bumpers, a blend with plastics, etc.

The elastic terpolymer like EPDM rubber has been prepared mostly by copolymerizing three different monomers in the presence of a catalyst including a vanadium compound, such as a vanadium-based Ziegler-Natta catalyst. However, since the vanadium-based catalyst has low catalytic activity, there is a need to use an excess of the catalyst, thereby adversely increasing the content of the residual metals in the copolymer. It is therefore necessary to add the process for catalyst elimination and decolorization and also a low-temperature polymerization process, in which case the reaction temperature is hard to control. The truth is that it is disadvantageously not easy to control the uptake rate of the comonomers such as propylene and diene and to prepare an elastic copolymer with high molecular weight and high viscosity. Hence, in the case of using the vanadium-based catalyst, there has been a limitation on the preparation of the elastic terpolymer with various properties. To overcome this problem, there has recently been developed a method of preparing an elastic terpolymer like EPDM rubber by using a metallocene-based group 4 transition metal catalyst in place of the vanadium-based Ziegler-Natta catalyst.

Such a group 4 transition metal catalyst shows high polymerization activity in the polymerization of olefins, and makes it possible not only to prepare the copolymer having higher molecular weight but also to control the molecular weight distribution and the composition of the copolymer with ease. Furthermore, it has an advantage of enabling the copolymerization of different comonomers. For example, U.S. Pat. Nos. 5,229,478 and 6,545,088, and Korea Pat. No. 0,488,833 disclose that an elastic terpolymer having a high molecular weight can be obtained with excellent polymerization activity by using various metallocene-based group 4 transition metal catalysts prepared from ligands, such as cyclopentadienyl, indenyl, fluorenyl, and so on.

However, the use of the conventional group 4 transition metal catalyst for copolymerization of three different monomers has a disadvantage in that the repeating units derived from the individual monomers are unevenly distributed in the chain of the copolymer because of high reactivity to the comonomer of alpha-olefin. For this reason, it is in fact difficult to obtain an elastic terpolymer such as EPDM rubber with excellent elasticity and flexibility.

Accordingly, there has been a sustained demand for developing an elastic terpolymer with good mechanical properties and elasticity (flexibility) at the same time and a method for preparing the same with high productivity and yield.

SUMMARY OF THE INVENTION

The present invention provides an elastic terpolymer that acquires good mechanical properties and elasticity (flexibility) at the same time.

Further, the present invention provides a preparation method for elastic terpolymer that makes it possible to prepare the elastic terpolymer with high productivity.

The present invention provides an elastic terpolymer, which is a copolymer of 40 to 70 wt % of ethylene, 15 to 55 wt % of a $C_3$-$C_{20}$ alpha-olefin, and 0.5 to 20 wt % of a diene as obtained in the presence of a group 4 transition metal catalyst, where the elastic terpolymer satisfies that:

i) the weight average molecular weight measured by GPC is 100,000 to 500,000; and ii) the ethylene content x (wt %) and the crystallization enthalpy y ($\Delta Hc$; J/g) of the copolymer measured by DSC satisfy the relational expression given by $1.55x-80.00 \le y \le 1.55x-75.00$.

The present invention further provides a method for preparing the elastic terpolymer that comprises: copolymerizing a monomer composition comprising 40 to 70 wt % of ethylene, 20 to 50 wt % of a $C_3$-$C_{20}$ alpha-olefin, and 2 to 20 wt % of a diene, while feeding the composition continuously into a reactor, in the presence of a catalyst composition comprising a first transition metal compound represented by the following Chemical Formula 1 and a second transition metal compound represented by the following Chemical Formula 2:

[Chemical Formula 1]

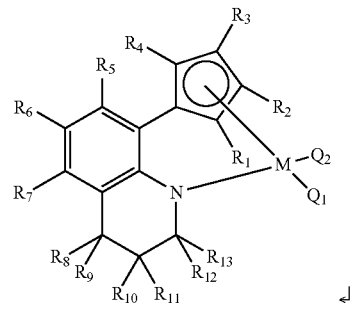

[Chemical Formula 2]

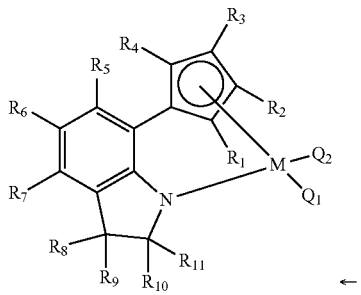

In the Chemical Formula 1 or 2, $R_1$ to $R_{13}$ are the same as or different from each other and independently include hydrogen, a $C_1$-$C_{20}$ alkyl radical, a $C_2$-$C_{20}$ alkenyl radical, a $C_6$-$C_{20}$ aryl radical, a silyl radical, a $C_7$-$C_{20}$ alkylaryl radical, a $C_7$-$C_{20}$ arylalkyl radical, or a metalloid radical of a group 4 metal substituted with hydrocarbyl, wherein two different adjacent groups of $R_1$ to $R_{13}$ are connected to each other via an alkylidene radical including a $C_1$-$C_{20}$ alkyl radical or a $C_6$-$C_{20}$ aryl radical to form an aliphatic ring or an aromatic ring;

M is a group 4 transition metal; and $Q_1$ and $Q_2$ are the same as or different from each other and independently include a halogen radical, a $C_1$-$C_{20}$ alkyl radical, a $C_2$-$C_{20}$ alkenyl radical, a $C_6$-$C_{20}$ aryl radical, a $C_7$-$C_{20}$ alkylaryl radical, a $C_7$-$C_{20}$ arylalkyl radical, a $C_1$-$C_{20}$ alkylamido radical, a $C_6$-$C_{20}$ arylamido radical, or a $C_1$-$C_{20}$ alkyliene radical.

DETAILED DESCRIPTION OF THE EMBODIMENTS

Hereinafter, a detailed description will be given as to an elastic terpolymer and a method for preparing the same according to exemplary embodiments of the present invention.

Unless otherwise specified, the term "elastic terpolymer" used in this specification may be defined as follows. The term "elastic terpolymer" may refer to any elastic copolymer (for example, cross-linkable random copolymer) prepared by copolymerization of three different monomers of ethylene, a $C_3$-$C_{20}$ alpha-olefin, and a diene. A representative example of the "elastic terpolymer" is the EPDM rubber that is a copolymer of ethylene, propylene, and a diene. However, the term "elastic terpolymer" is not limited to the copolymer of three monomers only, but it may, of course, include any elastic copolymer prepared from ethylene, at least one monomer belonging to the category of alpha-olefin and at least one monomer belonging to the category of diene. For example, the elastic copolymer of ethylene, two different alpha-olefins such as propylene and 1-butene, and two different dienes such as ethylidene norbornene and 1,4-hexadiene may also belong to the category of the "elastic terpolymer", since it is prepared by copolymerization of three different monomers belonging to the categories of ethylene, alpha-olefin, and diene, respectively.

In accordance with one exemplary embodiment of the present invention, there is provided an elastic terpolymer, which is a copolymer of 40 to 70 wt % of ethylene, 15 to 55 wt % of a $C_3$-$C_{20}$ alpha-olefin, and 0.5 to 20 wt % of a diene as obtained in the presence of a group 4 transition metal catalyst, where the elastic terpolymer satisfies that:

i) the weight average molecular weight measured by GPC is 100,000 to 500,000; and ii) the ethylene content x (wt %) and the crystallization enthalpy y (ΔHc; J/g) of the copolymer measured by DSC satisfy the relational expression given by $1.55x-80.00 \leq y \leq 1.55x-75.00$.

The elastic terpolymer according to one exemplary embodiment, which is a polymer prepared by copolymerization of three different monomers of ethylene, alpha-olefin and diene, has a relatively high weight average molecular weight of about 100,000 to 500,000, or about 1,500,000 to 400,000, or 200,000 to 300,000 as measured by GPC. Such a high weight average molecular weight results from the high activity of the group 4 transition metal catalysts, such as, for example, the after-mentioned first and second transition metal compounds represented by the Chemical Formulas 1 and 2 that belong to the metallocene catalysts. As the elastic terpolymer according to one exemplary embodiment such as, for example, EPDM rubber has such a high molecular weight, it can display good mechanical properties.

In addition, the elastic terpolymer according to one exemplary embodiment may satisfy the relational expression given by $1.55x-80.00 \leq y \leq 1.55x-75.00$, where x is the ethylene content (wt %) and y is the crystallization enthalpy (ΔHc; J/g) measured by DSC. For a specific example, it may satisfy the relational expression given by $y=1.55x-78.06$.

As for the elastic terpolymer of one exemplary embodiment that satisfies the above relation, the degree of crystallization with respect to the ethylene content is not that high but may be in an optimized range. As the elastic terpolymer of one exemplary embodiment has the degree of crystallization with respect to the ethylene content in the optimized range, it can display more enhanced elasticity and flexibility as well as good mechanical properties. Therefore, the elastic terpolymer of one exemplary embodiment can be prepared with high productivity and yield, which are peculiar to, for example, the group 4 transition metal catalyst belonging to the category of the metallocene catalyst, have high molecular weight and hence good mechanical properties and solve the problems with the conventional EPDM rubber prepared in the presence of the metallocene-based group 4 transition metal catalyst, thereby acquiring good elasticity and flexibility at the same time.

Therefore, the elastic terpolymer of one exemplary embodiment can be preferably used as an EPDM rubber prepared using the group 4 transition metal catalyst.

On the other hand, in the elastic terpolymer of one exemplary embodiment, the relational expression of the ethylene content x and the crystallization enthalpy y can be measured as follows. Firstly, at least two different elastic terpolymers with different ethylene contents in the above-defined range of ethylene content are prepared through polymerization. Then, DSC curve data for each copolymer are acquired with a DSC measurement instrument such as, for example, PerkinElmer DSC 6000, etc. Such DSC curve data can be acquired, for example, in the form as shown in FIG. 2. In order to obtain the DSC curve data, a DSC analysis is carried out by heating each copolymer sample up to about 100° C. at the rate of about 0° C. to about 20° C. per minute, maintaining the corresponding temperature for about 2 minutes and then cooling down to about −150° C. at the rate of about −10° C./min. The DSC curve data thus obtained can be used to calculate the crystallization enthalpy and the average crystallization temperature Tc (° C.).

Data for each copolymer are displayed by plotting the ethylene content of the copolymer on the x-axis and the crystallization enthalpy measured for the copolymer on the y-axis. The data are then subjected to linear regression to determine the relational expression of the ethylene content x and the crystallization enthalpy y. An example of the relational expression of x and y is as illustrated in FIG. 3.

From the relational expression of x and y in the elastic terpolymer of one exemplary embodiment as obtained by the above-described method, it can be seen that the elastic terpolymer has a lower crystallization enthalpy with respect to the ethylene content than the existing EPDM rubber using the group 4 transition metal catalyst. This also shows that the elastic terpolymer can satisfy the relational expression given by y≤1.55x−75.00. Therefore, the elastic terpolymer of one exemplary embodiment can be prepared to display good elasticity and flexibility at the same time in addition to good mechanical properties as a result of the high molecular weight. The elastic terpolymer can be preferably used as the EPDM rubber or like, since it is prepared using a group 4 transition metal catalyst, thereby not only to have high productivity and yield and good mechanical properties but also to display more enhanced elasticity and flexibility as required to the EPDM rubber. In addition, the elastic terpolymer also satisfies the relational expression given by 1.55x−80.00≤y and thus acquires the crystallization enthalpy to a minimum level or above with respect to the ethylene content, so it can display appropriate mechanical properties and heat resistance as required to the EPDM rubber.

And, the elastic terpolymer of one exemplary embodiment can satisfy the above-specified relational expression of the ethylene content and the crystallization enthalpy in the entire content ranges of the monomers that lead to appropriate properties as required to the EPDM rubber or the like, that is, for example, about 40 to 70 wt % or about 50 to 70 wt % of ethylene, about 15 to 55 wt % or about 25 to 45 wt % of a $C_3$-$C_{20}$ alpha-olefin, and 0.5 to 20 wt % or about 2 to 10 wt % of a diene. Therefore, the elastic terpolymer can preferably acquire more enhanced elasticity and flexibility as the EPDM rubber. When the content of each monomer is out of the above-defined range, the elastic terpolymer can neither acquire appropriate properties as the EPDM rubber nor satisfy the above-specified relational expression of the ethylene content and the crystallization enthalpy.

The elastic terpolymer of one exemplary embodiment may also have a characteristic that the product of the reactivity ratio constant Re representing the distribution state of ethylene in the copolymer and the reactivity ratio constant Rc representing the distribution state of alpha-olefin in the copolymer, that is, Re*Rc is less than about 1, for example, about 0.60 to 0.99, or about 0.80 to 0.95.

From the above specific value, Re=k11/k12 and Rc=k22/k21, where k11 is the growth rate constant when ethylene comes after ethylene in the chain of the copolymer; k12 is the growth rate constant when alpha-olefin comes after ethylene in the chain of the copolymer; k21 is the growth rate constant when ethylene comes after alpha-olefin in the chain of the copolymer; and k22 is the growth rate constant when alpha-olefin comes after alpha-olefin in the chain of the copolymer.

The individual growth rate constants, that is, k11, k12, k21 and k22 can be measured by analyzing each copolymer using $^{13}$C-NMR. For example, the value of Re*Rc can be calculated from the results of the $^{13}$C-NMR analysis according to the Triad Sequence analysis using the Randall method [Journal of Polymer Science: Polymer Physics edition, 1973, 11, 275-287] and the Kakugo method [Macromolecules 1982, 15, 1150].

When the value of Re*Rc is less than about 1, it means that the chain of the copolymer is highly likely to have alpha-olefin come after ethylene and ethylene after alpha-olefin, leading to an alternating distribution of ethylene and alpha-olefin. Contrarily, when the value of Re*Rc is about 1, it means that the copolymer chain has a random distribution of the ethylene and alpha-olefin monomers. When the value of Re*Rc is greater than about 1, it means that the monomers of the same type bind together to form the copolymer chain in the form of a block copolymer.

As the value of Re*Rc is less than about 1, for example, about 0.60 to 0.99, or about 0.80 to 0.95, the elastic terpolymer of one exemplary embodiment can have the arrangement of the monomers in an even and alternating manner. This leads to having the degree of crystallization not that high, so the copolymer can display more enhanced elasticity and flexibility as required to the EPDM rubber or the like.

On the other hand, the crystallization temperature Tc of the elastic terpolymer of one exemplary embodiment as measured by the DSC method may be in the range of −55 to 30° C. or about −40 to 15° C. In this regard, the crystallization temperature can be measured in a manner of obtaining DSC curve data in the above-described method and then calculating the average crystallization temperature from the DSC curve data. As the copolymer has such a range of the crystallization temperature, it can display good elasticity and flexibility and more enhanced processability and heat resistance as the EPDM rubber or the like. When the crystallization temperature is extremely low, the elastic terpolymer may deteriorate in the heat resistance. Contrarily, when the crystallization temperature is extremely high, the elastic terpolymer may deteriorate in the elasticity or the like.

And, the elastic terpolymer of one exemplary embodiment may have a density in the range for acquiring appropriate properties as the EPDM rubber or the like, for example, about 0.840 to 0.895 g/cm$^3$ or about 0.850 to 0.890 g/cm$^3$.

Further, the elastic terpolymer of one exemplary embodiment may have a Mooney viscosity (ML$_{1+4}$@125° C.) in the range to acquire appropriate properties as the EPDM rubber or the like, for example, about 1 to 180, or about 5 to 150, or about 20 to 130.

And, in the elastic terpolymer of one embodiment, the alpha-olefin may be at least one $C_3$-$C_{20}$ alpha-olefin selected from propylene, 1-butene, 1-hexene, 1-octene, 1-pentene, 4-methyl-1-pentene, 1-hexene, 1-heptene, 1-decene, 1-undecene, 1-dodecene, 1-tridecene, 1-tetradecene, 1-pentadecene, 1-hexadecene, 1-heptadecene, 1-nonadecene, 9-methyl-1-decene, 11-methyl-1-dodecene, 12-ethyl-1-tetradecene, and so on. Among them, propylene, 1-butene, 1-hexene, or 1-octene may be properly used as the $C_3$-$C_{20}$ alpha-olefin. Further, unconjugated diene-based monomers may be used as the diene. Specific examples of the diene may include 5-ethylidene-2-norbornene, 5-methylene-2-norbornene, 5-vinyl-2-norbornene, 5-(2-prophenyl)-2-norbornene, 5-(3-butenyl)-2-norbornene, 5-(1-methyl-2-prophenyl)-2-norbornene, 5-(4-pentenyl)-2-norbornene, 5-(1-methyl-3-butenyl)-2-norbornene, 5-(5-(hexenyl)-2-norbornene, 5-(1-methyl-4-pentenyl)-2-norbornene, 5-(2,3-dimethyl-3-butenyl)-2-norbornene, 5-(2-ethyl-3-butenyl)-2-norbornene, 5-(6-heptenyl)-2-norbornene, 5-(3-methylhexenyl)-2-norbornene, 5-(3,4-dimethyl-4-pentenyl)-2-norbornene, 5-(3-ethyl-4-pentenyl)-2-norbornene, 5-(7-octenyl)-2-norbornene, 5-(2-methyl-6-heptenyl)-2-norbornene, 5-(1,2-dimethyl-5-hexenyl)-2-norbornene, 5-(5-ethyl-5-hexenyl)-2-norbornene, 5-(1,2,3-trimethyl-4- pentenyl)-2-norbornene, 5-propylidene-2-norbornene, 5-isopropylidene-2-norbornene, 5-butylidene-2-norbornene, 5-isobutylidene-2-norbornene, 2,3-diisopropylidene-5-norbornene, 2-ethylidene-3-isopropylidene-5-norbornene, 2-propenyl-2,2-norbornadiene, 1,4-hexadiene, dicyclopentadiene, and so forth, out of which at least one diene may be selected. Among these, 5-ethylidene-2-norbornene, 5-methylene-2-norbornene, 5-vinyl-2-norbornene, 1,4-hexadiene, or dicyclopentadiene may be properly used as the diene.

In accordance with another exemplary embodiment of the present invention, there is provided a method for preparing the above-described elastic terpolymer of one exemplary embodiment. The method of preparing the elastic terpolymer may comprise copolymerizing a monomer composition comprising 40 to 70 wt % of ethylene, 20 to 50 wt % of a $C_3$-$C_{20}$ alpha-olefin, and 2 to 20 wt % of a diene, while feeding the composition continuously into a reactor, in the presence of a catalyst composition comprising a first transition metal compound represented by the following Chemical Formula 1 and a second transition metal compound represented by the following Chemical Formula 2:

[Chemical Formula 1]

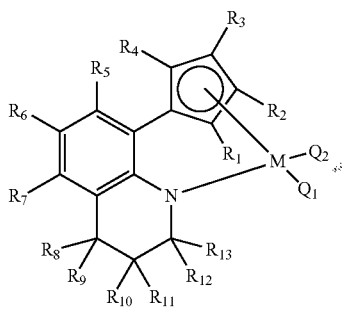

[Chemical Formula 2]

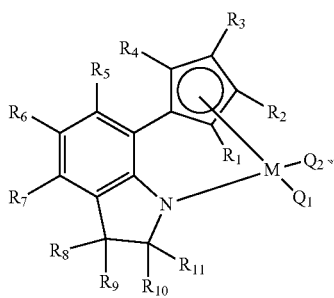

In the Chemical Formula 1 or 2, $R_1$ to $R_{13}$ are the same as or different from each other and independently include hydrogen, a $C_1$-$C_{20}$ alkyl radical, a $C_2$-$C_{20}$ alkenyl radical, a $C_6$-$C_{20}$ aryl radical, a silyl radical, a $C_7$-$C_{20}$ alkylaryl radical, a $C_7$-$C_{20}$ arylalkyl radical, or a metalloid radical of a group 4 metal substituted with hydrocarbyl, where two different adjacent groups of $R_1$ to $R_{13}$ are connected to each other via an alkylidene radical including a $C_1$-$C_{20}$ alkyl radical or a $C_6$-$C_{20}$ aryl radical to form an aliphatic ring or an aromatic ring;

M is a group 4 transition metal; and $Q_1$ and $Q_2$ are the same as or different from each other and independently include a halogen radical, a $C_1$-$C_{20}$ alkyl radical, a $C_2$-$C_{20}$ alkenyl radical, a $C_6$-$C_{20}$ aryl radical, a $C_7$-$C_{20}$ alkylaryl radical, a $C_7$-$C_{20}$ arylalkyl radical, a $C_1$-$C_{20}$ alkylamido radical, a $C_6$-$C_{20}$ arylamido radical, or a $C_1$-$C_{20}$ alkyliene radical.

As recognized in the following Examples, the elastic terpolymer of one exemplary embodiment that satisfies the high molecular weight range and the above-defined relational expression of the ethylene content and the crystallization enthalpy as mentioned above can be obtained with high yield and productivity by using a defined content of monomers, namely, about 40 to 70 wt % or about 50 to 70 wt % of ethylene, about 15 to 55 wt % or about 25 to 45 wt % of a $C_3$-$C_{20}$ alpha-olefin, and about 0.5 to 20 wt % or about 2 to 10 wt % of a diene and copolymerizing the monomers through the continuous polymerization process in the presence of two different transition metal catalysts represented by the Chemical Formulas 1 and 2, respectively.

It may be due to the high catalytic activity of the two different catalysts and the high reactivity of the comonomers. The specific catalysts of the first and second transition metal compounds have a good catalytic activity as group 4 transition metal catalysts and thus display high selectivity and copolymerization reactivity particularly to the comonomers such as alpha-olefins and dienes. By using the two different catalysts, the copolymerization can be carried out in such a manner that the diene is evenly distributed in the copolymer chain with a relatively high content. The reason is presumably that the surroundings of the metal sites of the specific catalysts of Chemical Formula 1 or 2 are maintained very stable with a firm 5-membered ring and 6-membered ring structure by way of the quinoline-based amido group, thereby providing a structural characteristic that the monomers are easily accessible.

Moreover, the comonomers, especially dienes, can be distributed in the chain of the copolymer more evenly by using the two different catalysts of the first and second transition metal compounds and carrying out the copolymerization in a continuous process while providing the monomer composition including the monomers continuously into the reactor.

As a result, an elastic terpolymer having a high molecular weight with an even and alternating distribution of monomers can be prepared with high productivity and yield. Due to the characteristic that the monomers are evenly and alternately distributed, the elastic terpolymer thus obtained can have the degree of crystallization with respect to the ethylene content optimized not to be that high and thus meet the characteristics of the one exemplary embodiment, for example, the relational expression given by $1.55x-80.00 \leq y \leq 1.55x-75.00$, where x is the ethylene content and y is the crystallization enthalpy, or the characteristic that the value of Re*Rc is less than 1.

In addition, by controlling the content of the monomers within an optimized range, that is, about 40 to 70 wt % or about 50 to 70 wt % of ethylene, about 15 to 55 wt % or about 25 to 45 wt % of a $C_3$-$C_{20}$ alpha-olefin, and about 0.5 to 20 wt % or about 2 to 10 wt % of a diene, the monomers can be distributed more evenly and alternately in the chain of the copolymer. This makes it possible to effectively prepare an elastic terpolymer that satisfies the characteristics of one exemplary embodiment.

Therefore, according to the preparation method of another exemplary embodiment, the elastic terpolymer of one exemplary embodiment can be prepared with high productivity and yield and very preferably used as the EPDM rubber being prepared by using the group 4 transition metal catalyst and displaying good mechanical properties and more improved elasticity at the same time.

However, in the cases of not using the two different catalysts disclosed above, using only one of the catalysts, or getting out of the above-defined proper content range of the monomers, especially diene, the final elastic terpolymer product may satisfy neither the high molecular weight range nor the relational expression of the ethylene content x and the crystallization enthalpy y, as given by 1.55x−80.00≤y≤1.55x−75.00.

Hereinafter, a more detailed description will be given as follows as to the first and second transition metal compounds represented by the Chemical Formulas 1 and 2, respectively, in the method of preparing the elastic terpolymer according to another exemplary embodiment.

In the Chemical Formulas 1 and 2, the hydrocarbyl may refer to a monovalent functional group of hydrocarbon from which the hydrogen atom is eliminated. For example, the hydrocarbyl may inclusively refer to an alkyl such as ethyl, etc. or an aryl such as phenyl, etc.

In the Chemical Formulas 1 and 2, the metalloid is an element showing intermediate characteristic of metal and non-metal. For example, the metalloid may refer to arsenic, boron, silicon, tellurium, and so on. And, M may denote a group 4 transition metal element, such as, for example, titanium, zirconium, hafnium, etc.

Among the first and second transition metal compounds, the first transition metal compound represented by the Chemical Formula 1 may be at least one properly selected from the group consisting of the compounds represented by the following chemical formulas:

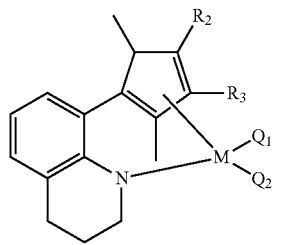

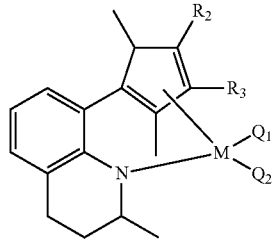

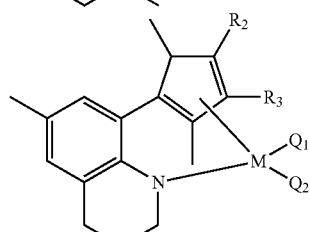

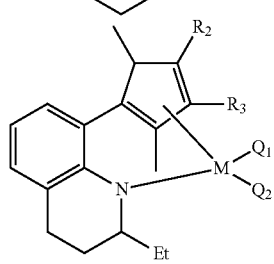

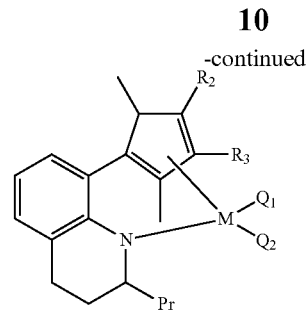

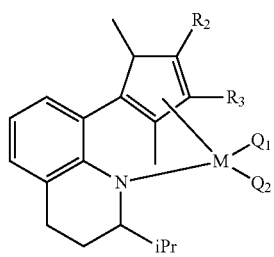

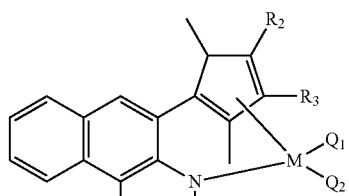

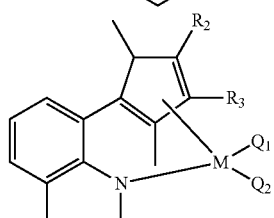

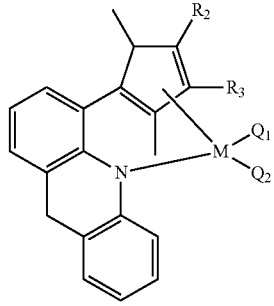

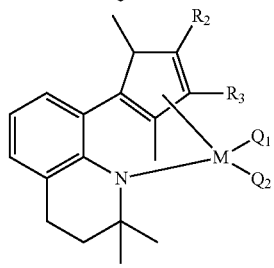

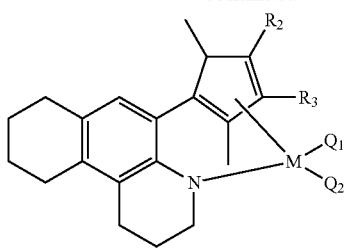

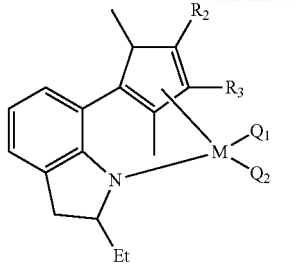

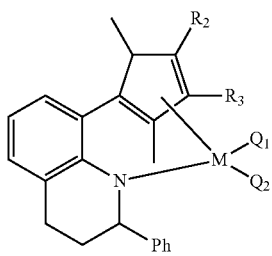

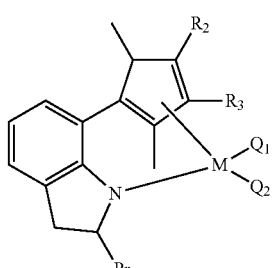

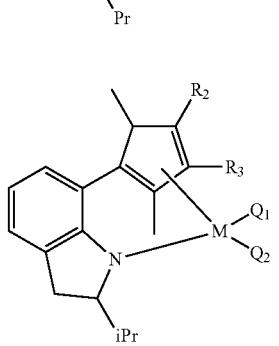

In the chemical formulas, $R_2$ and $R_3$ are the same as or different from each other and independently include hydrogen or a methyl radical; M is a group 4 transition metal; and $Q_1$ and $Q_2$ are the same as or different from each other and independently include a methyl radical, a dimethylimido radical, or a chlorine radical.

Furthermore, the second transition metal compound represented by the Chemical Formula 2 may be at least one compound properly selected from the group consisting of the compounds represented by the following chemical formulas:

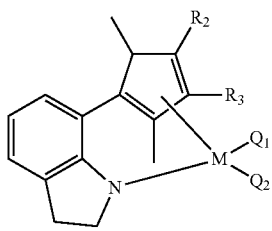

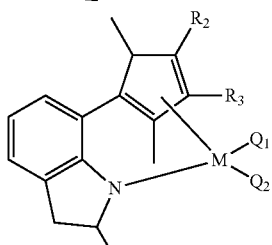

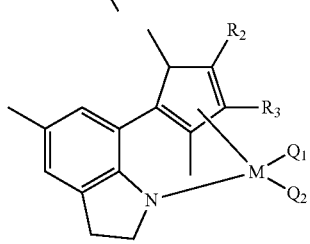

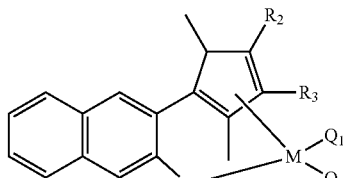

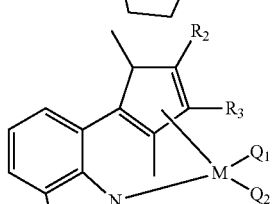

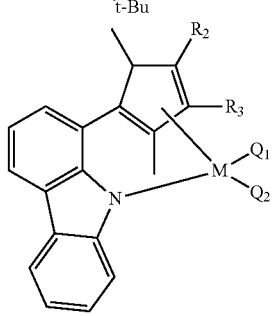

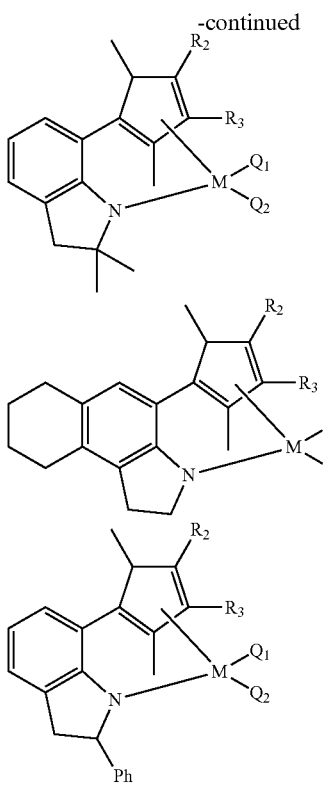

In the chemical formulas, $R_2$ and $R_3$ are the same as or different from each other and independently include hydrogen or a methyl radical; M is a group 4 transition metal; and $Q_1$ and $Q_2$ are the same as or different from each other and independently include a methyl radical, a dimethylimido radical, or a chlorine radical.

On the other hand, the catalyst composition used in the preparation method of another exemplary embodiment may further include at least one cocatalyst compound selected from the group consisting of the compounds represented by the following Chemical Formula 3, 4 or 5 in addition to the first and second transition metal compounds:

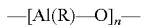    [Chemical Formula 3]

In the Chemical Formula 3, R is the same as or different from each other and independently includes a halogen, a $C_1$-$C_{20}$ hydrocarbon, or a $C_1$-$C_{20}$ hydrocarbon substituted with a halogen; and n is an integer of at least 2,

    [Chemical Formula 4]

In the Chemical Formula 4, R is as defined in the Chemical Formula 3; and D is aluminum or boron,

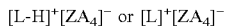    [Chemical Formula 5]

In the Chemical Formula 5, L is a neutral or cationic Lewis acid; H is hydrogen; Z is a group 13 element; A is the same as or different from each other and independently includes a $C_6$-$C_{20}$ aryl group or a $C_1$-$C_{20}$ alkyl group in which at least one hydrogen atom is substituted by a halogen atom, a $C_1$-$C_{20}$ hydrocarbon, alkoxy, or phenoxy, or not substituted.

Among the cocatalyst compounds, examples of the compound represented by the Chemical Formula 3 my include methylaluminoxane, ethylaluminoxane, isobutylaluminoxane, butylaluminoxane, etc.

Examples of the compound represented by the Chemical Formula 4 may include trimethyl aluminum, triethyl aluminum, triisobutyl aluminum, tripropyl aluminum, tributyl aluminum, dimethylchloro aluminum, triisopropyl aluminum, tri-s-butyl aluminum, tricyclopentyl aluminum, tripentyl aluminum, triisopentyl aluminum, trihexyl aluminum, trioctyl aluminum, ethyldimethyl aluminum, methyldiethyl aluminum, triphenyl aluminum, tri-p-tolyl aluminum, dimethyl aluminum methoxide, dimethyl aluminum ethoxide, trimethyl boron, triethyl boron, triisobutyl boron, tripropyl boron, tributyl boron, etc. Among these compounds, trimethyl aluminum, triethyl aluminum, or triisobutyl aluminum may be suitably used.

The compound represented by the Chemical Formula 5 may include a non-coordinating anion capable of coexisting with a cation that is a Bronsted acid. A suitable anion is what has relatively large size and includes a single coordinating complex compound including a metalloid. Particularly, a compound including single boron atom in the anion part is widely being used. In this respect, a salt having an anion including a coordinating complex compound including single boron atom may be suitably used as the compound represented by the Chemical Formula 5.

Examples of the compound of the Chemical Formula 5 may include trialkylammonium salts, such as trimethylammonium tetrakis(pentafluorophenyl)borate, triethylammonium tetrakis(pentafluorophenyl)borate, tripropylammonium tetrakis(pentafluorophenyl)borate, tri(n-butyl) ammonium tetrakis(pentafluorophenyl)borate, tri(2-butyl) ammonium tetrakis(pentafluorophenyl)borate, N,N-dimethyl anilinium tetrakis(pentafluorophenyl)borate, N,N-dimethylanilinium n butyltris(pentafluorophenyl)borate, N,N-dimethyl anilinium benzyltris(pentafluorophenyl)borate, N,N-dimethylanilinium tetrakis(4-(t-butyldimethylsilyl)-2,3,5,6-tetrafluorophenyl)borate, N,N-dimethylanilinium tetrakis(4-triisopropylsilyl)-2,3,5,6-tetrafluorophenyl)borate, N,N-dimethylanilinium pentafluorophenoxy tris(pentafluorophenyl)borate, N,N-diethylanilinium tetrakis(pentafluorophenyl)borate, N,N-dimethyl-2,4,6-trimethylanilinium tetrakis(pentafluorophenyl) borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl)borate, dimethyl(t-butyl) ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate, N,N-dimethyl-2,4,6-trimethylanilinium tetrakis(2,3,4,6-tetrafluorophenyl)borate, decyldimethylammonium tetrakis(pentafluorophenyl)borate, dodecyldimethylammonium tetrakis(pentafluorophenyl)borate, tetradecyldimethylammonium tetrakis(pentafluorophenyl)borate, hexadecyldimethylammonium tetrakis(pentafluorophenyl)borate, octadecyldimethylammonium tetrakis(pentafluorophenyl)borate, eicosyldimethylammonium tetrakis(pentafluorophenyl)borate, methyldidecylammonium tetrakis(pentafluorophenyl) borate, methyldidodecylammonium tetrakis(pentafluorophenyl)borate, methylditetradecylammonium tetrakis (pentafluorophenyl)borate, methyldihexadecylammonium tetrakis(pentafluorophenyl)borate, methyldioctadecylammonium tetrakis(pentafluorophenyl)borate, methyldieicosylammonium tetrakis(pentafluorophenyl)borate, tridecylammonium tetrakis(pentafluorophenyl)borate, tridodecylammonium tetrakis(pentafluorophenyl)borate, tritetradecylammonium tetrakis(pentafluorophenyl)borate, trihexadecylammonium tetrakis(pentafluorophenyl)borate, trioctadecylammonium tetrakis(pentafluorophenyl)borate, trieicosylammonium tetrakis(pentafluorophenyl)borate, decyldi(n-butyl)ammonium tetrakis(pentafluorophenyl)borate, dodecyldi(n-butyl)ammonium tetrakis(pentafluorophenyl)borate, cotadecyldi(n-butyl)ammonium tetrakis(pentafluorophenyl)borate, N,N-didodecylanilinium tetrakis(pentafluorophenyl)borate, N-methyl-N-dodecylanilinium tetrakis(pentafluorophenyl)borate, methyldi(dodecyl)ammonium tetrakis(pentafluorophenyl)borate, etc.

Examples of the dialkylammonium salt may include di-(i-propyl)ammonium tetrakis(pentafluorophenyl)borate, dicyclohexylammonium tetrakis(pentafluorophenyl)borate, etc.

Examples of the carbonium salt may include tropylium tetrakis(pentafluorophenyl)borate, triphenylmethylium tetrakis(pentafluorophenyl)borate, benzene(diazonium)tetrakis(pentafluorophenyl)borate, etc.

In the above-described preparation method of the elastic terpolymer, the catalyst composition may be prepared by the method, for example, including the steps of bringing the first and second transition metal compounds into contact with the cocatalyst compound of the Chemical Formula 3 or 4 so as to obtain a mixture; and adding the cocatalyst of the Chemical Formula 5 to the mixture.

In the catalyst composition, the molar ratio of the first transition metal compound to the second transition metal compound may be about 10:1 to 1:10. The molar ratio of the first and second transition metal compounds to the cocatalyst compound of the Chemical Formula 3 or 4 may be about 1:5 to 1:500. And, the molar ratio of the first and second transition metal compounds to the cocatalyst compound of the Chemical Formula 5 may be about 1:1 to 1:10.

In the preparation method of the elastic terpolymer, the catalyst composition may further comprise a reaction solvent. The reaction solvent may include, but is not limited to, a hydrocarbon solvent, such as pentane, hexane, or heptane; or an aromatic solvent, such as benzene or toluene.

As disclosed above, the alpha-olefin included in the monomer composition may be propylene, 1-butene, 1-hexene, 1-octene, 1-pentene, 4-methyl-1-pentene, 1-hexene, 1-heptene, 1-decene, 1-undecene, 1-dodecene, etc.; and the diene may be an unconjugated diene-based monomer. Among these, the monomers commonly used in the preparation of the EPDM rubber may be selected. For example, propylene is used as the alpha-olefin monomer, and an unconjugated diene-based monomer, such as 5-ethylidene-2-norbornene, 5-methylene-2-norbornene, 1,4-hexadiene, or dicyclopentadiene is used as the diene monomer.

In the preparation method of the copolymer according to another exemplary embodiment, the copolymerizing step may be carried out at the temperature of about 80 to 200 □ or about 100 to 160 □. Such a copolymerization may be carried out according to the solution polymerization method, particularly, the continuous solution polymerization method. In this regard, the above-mentioned catalyst composition may be used in the form of a homogeneous catalyst dissolved in the solution.

For carrying out the continuous solution polymerization process, the copolymerizing step may be carried out while continuously feeding the above-mentioned monomer composition, the first and second transition metal compounds, and the catalyst composition selectively including a cocatalyst compound in the liquid state into the reactor and continuously discharging the resultant elastic terpolymer from the reactor.

Such a continuous solution polymerization process enables the individual monomers to distribute in a more even and alternating arrangement in the chain of the copolymer. This can lead to preparation of an elastic terpolymer satisfying the characteristics of the one exemplary embodiment more effectively with high productivity and yield.

According to the present invention, as described above, an elastic terpolymer can be prepared using a group 4 transition metal catalyst to acquire good mechanical properties and more enhanced elasticity and flexibility and thus very preferably used as the EPDM rubber or the like.

According to the present invention, there is provided a method of preparing the elastic terpolymer with high productivity and yield.

The elastic terpolymer prepared according to the present invention can overcome the limitations of the EPDM rubber prepared using the existing metallocene-based group 4 transition metal catalyst and acquire good elasticity and flexibility as well as other properties. This can not only bring out the best in the group 4 transition metal catalyst but also render the elastic terpolymer to be very preferably used as the EPDM rubber or the like.

EXAMPLES

Figure 1:
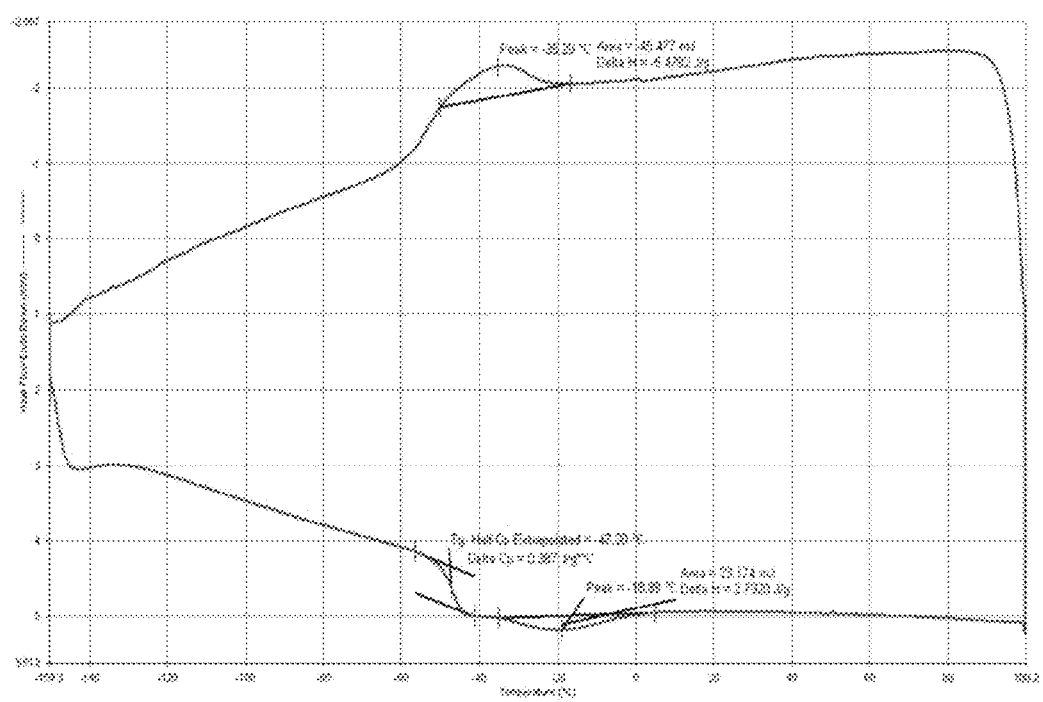
FIG. 1 shows the DSC curve data of an elastic terpolymer prepared in Comparative Example 1.

Hereinafter, the present invention will be described in further detail with reference to the following Examples, which are given only for illustrations of the present invention and not intended to limit the scope of the present invention.

<Synthesis of Ligands and Transition Metal Compounds>

Organic reagents and solvents as used herein were purchased from Aldrich Chemical Company Inc. and Merck Chemicals Ltd. and purified according to the standard method. All the synthesis steps were carried out while blocking the contact with air or moisture, to enhance the reproducibility of the experiments. For identification of the structure of a compound, a 400 MHz nuclear magnetic resonance (NMR) spectrometer and an X-ray spectrometer were used to obtain spectra and diagrams.

In the following Examples, the first and second transition metal compounds were [(1,2,3,4-tetrahydroquinolin-8-yl)tetramethylcyclopentadienyl-eta5,kapa-N]titanium dimethyl and [(2-methylindolin-7-yl)tetramethylcyclopentadienyl-eta5,kapa-N]titanium dimethyl, respectively; and the cocatalyst compound was N,N-dimethylanilinium tetrakis(pentafluorophenyl)borate or triisobutyl aluminum. The first and second transition metal compounds as used herein were prepared in the same manner as described in Examples 2 and 14 of Korean Pat. No. 0.976,131, and the cocatalyst as used herein was prepared in the same manner as described in Example 9 of Korean Pat. No. 0,820,542.

Examples 1 to 6

Preparation of Elastic Terpolymer of Ethylene, Propylene and 5-Ethylidene-2-Norbornene The copolymerization reaction of ethylene, propylene and 5-ethylidene-2-norbornene was continuously carried out in a 2 L pressure reactor. Hexane, as a polymerization solvent, was continuously fed into the reactor through the bottom at a rate of 7.6 kg per hour and continuously taken out from the top of the reactor.

[(1,2,3,4-Tetrahydroquinolin-8-yl)tetramethylcyclopentadienyl-eta5,kapa-N]titanium dimethyl and [(2-Methylindolin-7-yl)tetramethylcyclopentadienyl-eta5,kapa-N]titanium dimethyl as dissolved in hexane were used as the first and second transition metal compounds and fed into the reactor at the rate of 51 to 54 μmol per hour. N,N-dimethylanilinium tetrakis(pentafluorophenyl)borate dissolved in toluene was used as the cocatalyst compound and fed into the reactor at the rate of 255 to 270 μmol per hour. Further, triisobutyl aluminum dissolved in hexane was used as an additional cocatalyst compound and fed into the reactor at the rate of 4,080 to 4,200 μmol per hour.

For copolymerization of monomers, ethylene, propylene and 5-ethylidene-2-norbornene were continuously fed into the reactor at the rates of 950 g per hour, 820 to 950 g per hour and 86 to 129 g per hour, respectively.

The copolymerization temperature in the reactor was maintained in the range of 120 to 140° C. while the feeding rate of 5-ethylidene-2-norbornene was increased by 1 mL/min to 0.5 mL/min at around 140° C.

Under the above-defined conditions, the copolymerization process was carried out in the manner of the continuous solution polymerization to continuously prepare elastic terpolymers of Examples 1 to 6 in the homogeneous solution state. After suspension of the polymerization reaction in ethanol, the polymerized solution taken out from the top of the reactor was dried in a vacuum oven under vacuum to yield each polymer of Examples 1 to 6.

For the individual polymers thus obtained, the content of each monomer, the activity of the catalysts and the weight average molecular weight of the polymers are presented in Table 1. In this regard, the weight average molecular weight of each polymer was measured with PL-GPC 220 equipped with three linearly mixed bed columns as manufactured by Polymer Laboratory Ltd. The measurement was performed at 160° C. using 1,2,4-trichlorobenzene as a solvent at the flux of 1.0 ml/min.

TABLE 1

|  | Ethylene content (wt %) | Propylene content (wt %) | 5-ethylidene-2-norbornene content (wt %) | Catalytic activity (kg/g · hr) | Mw (g/mol) |
| --- | --- | --- | --- | --- | --- |
| Example 1 | 52.6 | 44.0 | 3.4 | 39.2 | 269,110 |
| Example 2 | 56.9 | 35.0 | 8.1 | 38.7 | 246,765 |
| Example 3 | 57.1 | 35.1 | 7.8 | 42.6 | 369,514 |
| Example 4 | 60.2 | 35.1 | 4.6 | 40.4 | 270,985 |
| Example 5 | 62.3 | 34.1 | 3.6 | 48.0 | 159,311 |
| Example 6 | 62.6 | 32.1 | 5.4 | 47.7 | 234,711 |

Comparative Examples 1 and 2

Elastic Terpolymer of Ethylene, Propylene, and 5-Ethylidene-2-Norbornene Commercially Available EPDM rubbers commercially available, DOW 4570 and Mitsui 3072 were used as elastic terpolymers of Comparative Examples 1 and 2, respectively.

Experimental Example 1

Evaluation of Properties (Density and Mooney Viscosity) of Polymers

The polymers obtained in Examples and Comparative Examples were measured in regards to the density by making a polymer sample treated with an antioxidant (e.g., Irganox 1076) into a sheet having a thickness of 3 mm and a radius of 2 cm using a press mold and weighing the sheet with a Mettler scale.

In addition, the Mooney viscosity of each polymer was measured with Monsanto MV 2000E equipment at 125° C.

The properties thus measured are presented in Table 2.

Experimental Example 2

Figure 2:
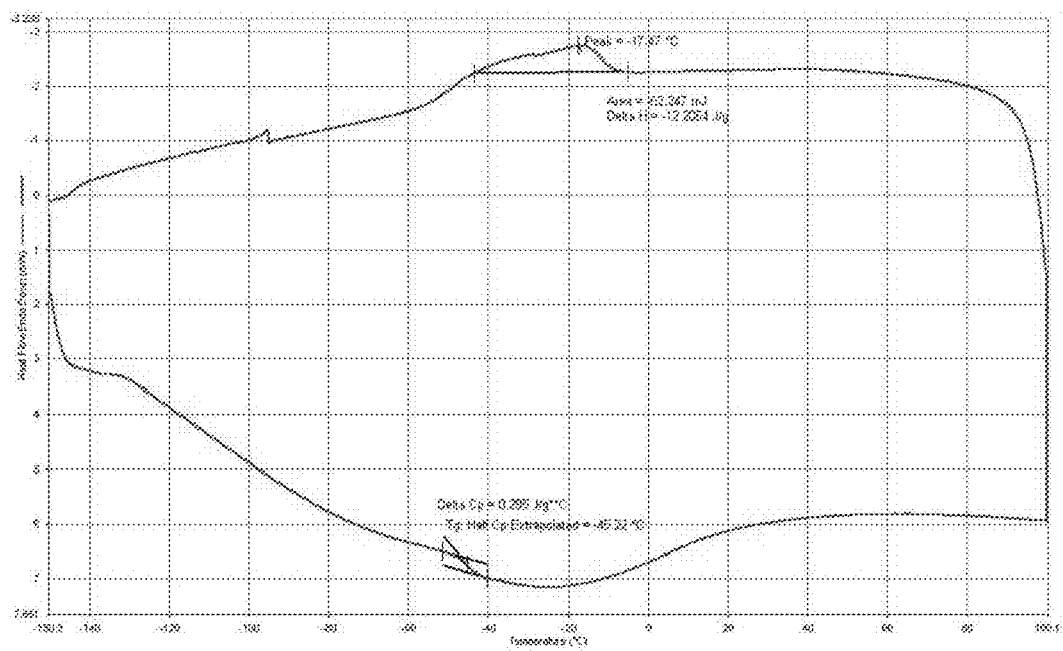
FIG. 2 shows the DSC curve data of an elastic terpolymer prepared in Example 2.

Measurement of Crystallization Enthalpy and Determination of Relational Expression of Ethylene Content and Crystallization Enthalpy For the copolymers of the Examples and Comparative Examples, DSC curve data were acquired using a DSC measurement instrument (PerkinElmer DSC 6000). More specifically, each copolymer sample was subjected to the DSC analysis by heating up to about 100° C. at the rate of about 0° C./min to about 20° C./min, maintaining at 100° C. for about 2 minutes and then cooling down to about −150° C. at the rate of about −10° C./min. The DSC curve data of Comparative Example 1 and Example 2 thus obtained are presented in FIGS. 1 and 2, respectively.

From the DSC curve data, the crystallization enthalpy and the average crystallization temperature Tc (° C.) of each copolymer were calculated. The average crystallization temperature was determined as the crystallization temperature of each copolymer. The crystallization temperature and the crystallization enthalpy of each copolymer are presented in Table 2.

Figure 3:
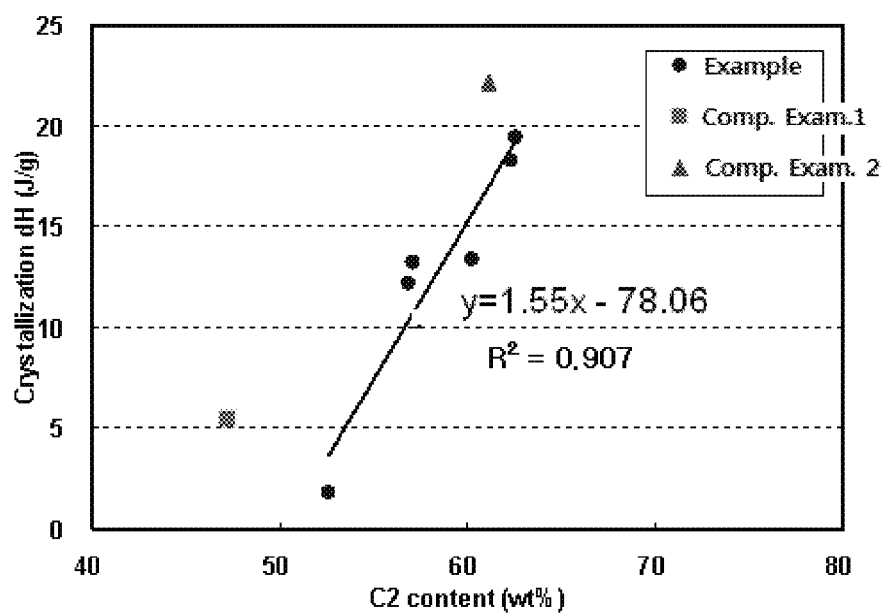
FIG. 3 is a graph showing the relational expression of the ethylene content x and the crystallization enthalpy y in the respective elastic terpolymers prepared in Examples 1 to 6 and Comparative Examples 1 and 2.

The data for each copolymer were displayed by plotting the content of ethylene included in the copolymer on the x-axis and the crystallization enthalpy measured for the copolymer on the y-axis. The data were subjected to linear regression to determine the relational expression of the ethylene content x and the crystallization enthalpy y. The relational expression is as illustrated in FIG. 3, which also presents the data of Comparative Examples 1 and 2 for the comparison with the data of Examples.

Experimental Example 3

Determination of Re*Rc

Each copolymer of Examples and Comparative Examples was analyzed using $^{13}$C-NMR to determine the individual growth rate constants, K11, K12, K21, and K22. In this regard, the measurement instrument was Bruker DRX 600 (600 MHz) and each polymer dissolved in ortho-dichlorobenzene-d4 used as a solvent was analyzed at 100° C.

Each growth rate constant was calculated from the $^{13}$C-NMR data by way of the Triad Sequence analysis using the Randall method [Journal of Polymer Science: Polymer Physics edition, 1973, 11, 275-287] and the Kakugo method [Macromolecules 1982, 15, 1150]. Then, the value of Re*Rc was calculated based on the equations given by Re=k11/k12 and Rc=k22/k21.

The value of Re*Rc for each polymer is presented in Table 2.

TABLE 2

|  | Ethylene content (wt %) | 5-ethylidene-2-norbornene content (wt %) | Mooney viscosity | Crystallization temperature (□) | Crystallization enthalpy (J/g) | Re*Rc |
|---|---|---|---|---|---|---|
| Example 1 | 52.6 | 3.4 | 82 | 3.7 | 1.8 | 0.922 |
| Example 2 | 56.9 | 8.1 | 76 | −17.5 | 12.2 | 0.942 |
| Example 3 | 57.1 | 7.8 | 133 | −14.5 | 13.2 | 0.843 |
| Example 4 | 60.2 | 4.6 | 85 | −7.0 | 13.4 | 0.979 |
| Example 5 | 62.3 | 3.6 | 42 | −1.1 | 18.3 | 0.820 |
| Example 6 | 62.6 | 5.4 | 87 | −0.6 | 19.4 | 0.930 |
| Comparative Example 1 | 47.2 | 5.0 | 72 | −35.3 | 5.5 | 1.341 |
| Comparative Example 2 | 61.1 | 2.1 | 91 | 6.81 | 22.2 | 1.373 |

Referring to Table 2 and FIG. 3, the copolymers of Examples 1 to 6 satisfy the relational expression given by $1.55x-80.00 \leq y \leq 1.55x-75.00$, especially, $y=1.55x-78.06$ ($R^2=0.907$), where x is the ethylene content and y is the crystallization enthalpy. And, the value of Re*Rc is less than 1. Contrarily, the copolymers of Comparative Examples 1 and 2 display the higher crystallization enthalpy than the copolymers of Examples 1 to 6 having the same ethylene content and do not satisfy the relational expression given by $1.55x-80.00 \leq y \leq 1.55x-75.00$, and the value of Re*Rc is greater than 1. It is therefore predicted that the elastic terpolymers of Examples 1 to 6 have the individual monomers evenly and alternately arranged in the copolymer chain and thus display the lower degree of crystallization with respect to the ethylene content and more excellences in elasticity and flexibility than the elastic terpolymers of Comparative Examples.

What is claimed is:

1. An elastic terpolymer, which is a copolymer of 40 to 70 wt % of ethylene, 15 to 55 wt % of a $C_3$-$C_{20}$ alpha-olefin, and 0.5 to 20 wt % of a diene as obtained in the presence of a group 4 transition metal catalyst, wherein the elastic terpolymer satisfies that:

the weight average molecular weight measured by GPC is 100,000 to 500,000; and ii) the ethylene content x (wt %) and the crystallization enthalpy y ($\Delta Hc$; J/g) of the copolymer measured by DSC satisfy the relational expression given by $1.55x-80.00 \leq y \leq 1.55x-75.00$.

2. The elastic terpolymer as claimed in claim 1, wherein the relational expression is satisfied in the entire ethylene content range of 40 to 70 wt %.

3. The elastic terpolymer as claimed in claim 1, wherein Re*Rc<1, wherein Re is the reactivity ratio constant representing the distribution of ethylene in the copolymer and Rc is the reactivity ratio constant representing the distribution of alpha-olefin in the copolymer, wherein Re=k11/k12 and Rc=k22/k21, wherein k11 is the growth rate constant when ethylene is bonded after ethylene in the chain of the copolymer; k12 is the growth rate constant when alpha-olefin is bonded after ethylene in the chain of the copolymer; k21 is the growth rate constant when ethylene is bonded after alpha-olefin in the chain of the copolymer; and k22 is the growth rate constant when alpha-olefin is bonded after alpha-olefin in the chain of the copolymer.

4. The elastic terpolymer as claimed in claim 3, wherein Re*Rc is 0.60 to 0.99.

5. The elastic terpolymer as claimed in claim 1, wherein the crystallization temperature Tc measured by DSC is −55 to 30° C.

6. The elastic terpolymer as claimed in claim 1, wherein the elastic terpolymer has a density of 0.840 to 0.895 g/cm³.

7. The elastic terpolymer as claimed in claim 1, wherein the elastic terpolymer has a Mooney viscosity ($ML_{1+4}$@125° C.) of 5 to 180.

8. The elastic terpolymer as claimed in claim 1, wherein the alpha-olefin comprises at least one selected from the group consisting of propylene, 1-butene, 1-hexene, and 1-octene, and the diene comprises at least one selected from the group consisting of 5-ethylidene-2-norbornene, 5-methylene-2-norbornene, 5,-vinyl-2-norbornene, 1,4-hexadiene, and dicyclopentadiene.

9. A method for preparing the elastic terpolymer as claimed in claim 1, the method comprising:

copolymerizing a monomer composition comprising 40 to 70 wt % of ethylene, 20 to 50 wt % of a $C_3$-$C_{20}$ alpha-olefin, and 2 to 20 wt % of a diene, while feeding the composition continuously into a reactor, in the presence of a catalyst composition comprising a first transition metal compound represented by the following Chemical Formula 1 and a second transition metal compound represented by the following Chemical Formula 2:

[Chemical Formula 1]

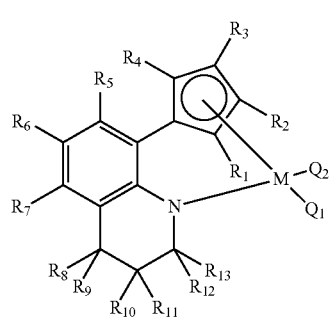

[Chemical Formula 2]

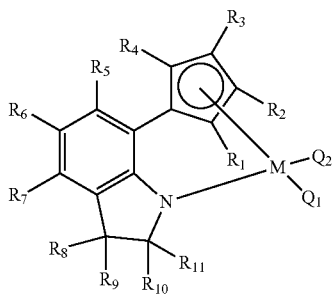

wherein $R_1$ to $R_{13}$ are the same as or different from each other and independently include hydrogen, a $C_1$-$C_{20}$ alkyl radical, a $C_2$-$C_{20}$ alkenyl radical, a $C_6$-$C_{20}$ aryl radical, a silyl radical, a $C_7$-$C_{20}$ alkylaryl radical, a $C_7$-$C_{20}$ arylalkyl radical, or a metalloid radical of a group 4 metal substituted with hydrocarbyl, wherein two different adjacent groups of $R_1$ to $R_{13}$ are connected to each other via an alkylidene radical including a $C_1$-$C_{20}$ alkyl radical or a $C_6$-$C_{20}$ aryl radical to form an aliphatic ring or an aromatic ring;

M is a group 4 transition metal; and $Q_1$ and $Q_2$ are the same as or different from each other and independently include a halogen radical, a $C_1$-$C_{20}$ alkyl radical, a $C_2$-$C_{20}$ alkenyl radical, a $C_6$-$C_{20}$ aryl radical, a $C_7$-$C_{20}$ alkylaryl radical, a $C_7$-$C_{20}$ arylalkyl radical, a $C_1$-$C_{20}$ alkylamido radical, a $C_6$-$C_{20}$ arylamido radical, or a $C_1$-$C_{20}$ alkyliene radical.

10. The method as claimed in claim 9, wherein the first transition metal compound is at least one selected from the group consisting of compounds represented by the following chemical formulas:

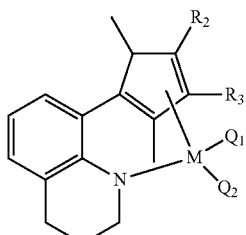
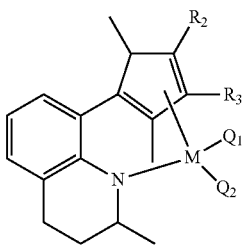
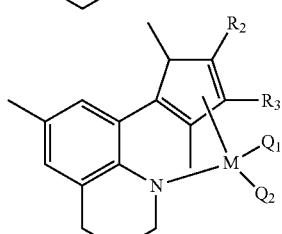
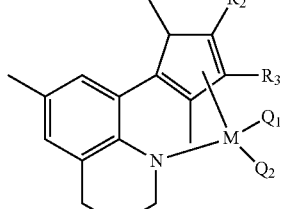
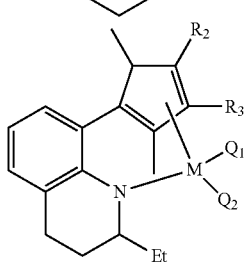
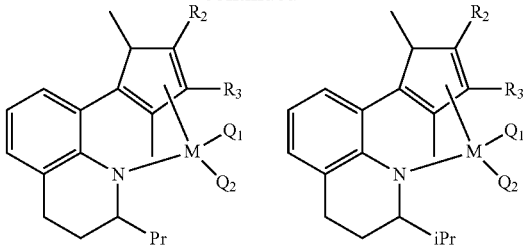
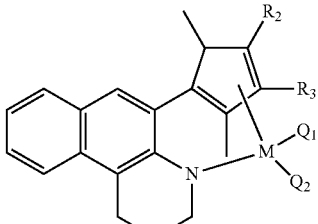
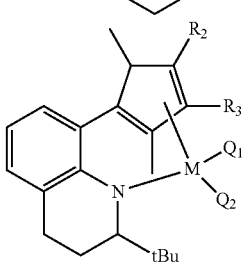
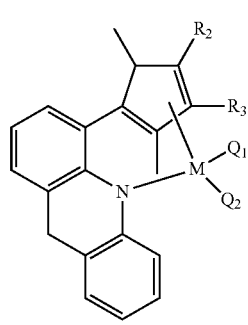
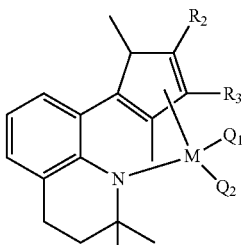
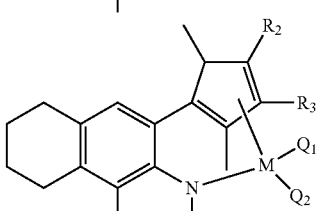
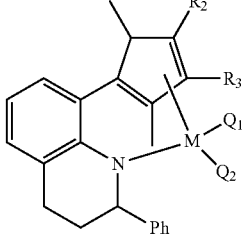

wherein $R_2$ and $R_3$ are the same as or different from each other and independently include hydrogen or a methyl radical; M is a group 4 transition metal; and $Q_1$ and $Q_2$ are the same as or different from each other and independently include a methyl radical, a dimethylimido radical, or a chlorine radical.

11. The method as claimed in claim 9, wherein the second transition metal compound is at least one selected from the group consisting of the compounds represented by the following chemical formulas:

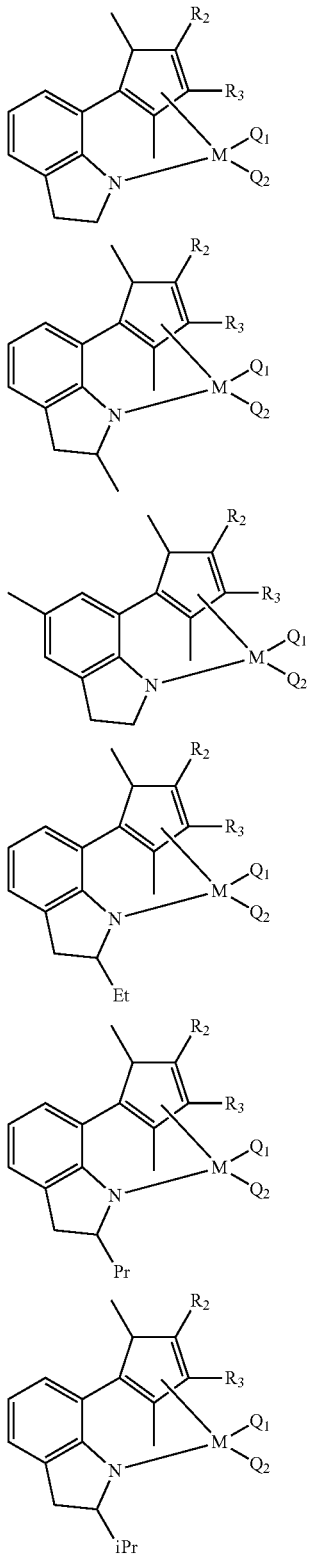

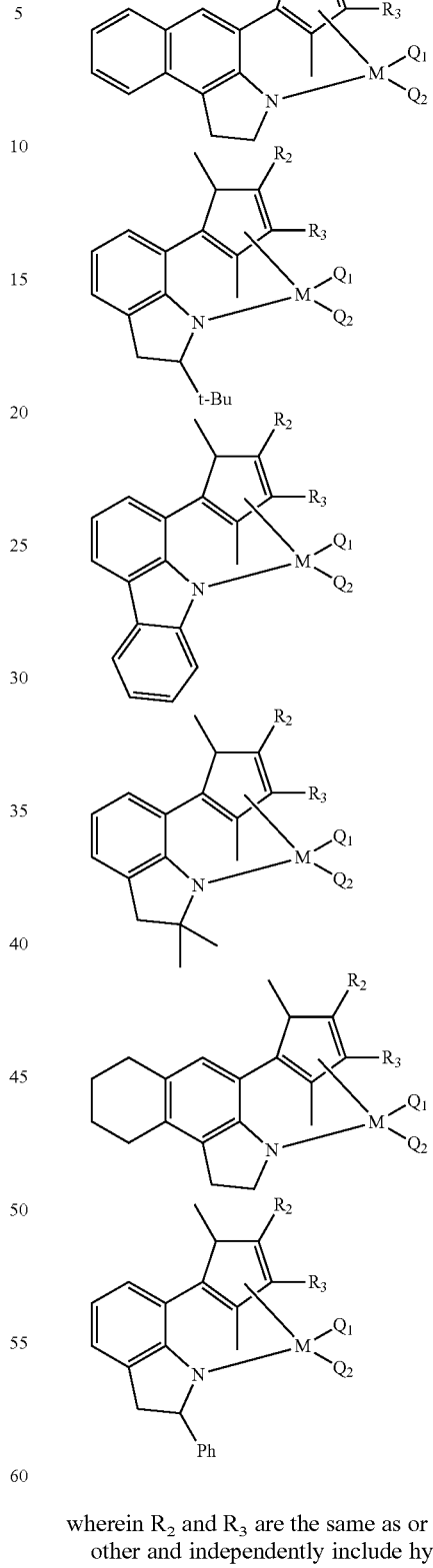

wherein $R_2$ and $R_3$ are the same as or different from each other and independently include hydrogen or a methyl radical; M is a group 4 transition metal; and $Q_1$ and $Q_2$ are the same as or different from each other and independently include a methyl radical, a dimethyl-imido radical, or a chlorine radical.

12. The method as claimed in claim 9, wherein the catalyst composition further comprises at least one selected from the group consisting of compounds represented by the following Chemical Formulas 3, 4 and 5:

—[Al(R)—O]$_n$— [Chemical Formula 3]

wherein R is the same as or different from each other and independently includes a halogen, a $C_1$-$C_{20}$ hydrocarbon, or a $C_1$-$C_{20}$ hydrocarbon substituted with a halogen; and n is an integer of at least 2, D(R)$_3$ [Chemical Formula 4]

wherein R is as defined in the Chemical Formula 3; and D is aluminum or boron,

[L-H]$^+$[ZA$_4$]$^-$ [Chemical Formula 5]

wherein L is a neutral or cationic Lewis base; H is hydrogen; Z is a group 13 element; A is the same as or different from each other and independently includes a $C_6$-$C_{20}$ aryl group or a $C_1$-$C_{20}$ alkyl group in which at least one hydrogen atom is substituted by a halogen atom, a $C_1$-$C_{20}$ hydrocarbon, alkoxy, or phenoxy, or not substituted.

13. The method as claimed in claim 9, wherein the alpha-olefin is at least one selected from the group consisting of propylene, 1-butene, 1-hexene, and 1-octene, and the diene includes at least one selected from the group consisting of 5-ethylidene-2-norbornene, 5-methylene-2-norbornene, 5-vinyl-2-norbornene, 1,4-hexadiene, and dicyclopentadiene.

14. The method as claimed in claim 12, wherein the copolymerization step is carried out while the monomer composition, the first and second transition metal compounds and a cocatalyst compound in the solid state are continuously fed into the reactor.

15. The method as claimed in claim 14, wherein the copolymerization step is carried out while the elastic terpolymer prepared is continuously discharged from the reactor.

* * * * *